United States Patent [19]
Kline, Sr.

[11] Patent Number: 5,419,073
[45] Date of Patent: May 30, 1995

[54] COMBINATION ICE FISHING HOLE MAINTAINING AND BAIT STORAGE DEVICE

[76] Inventor: Lyle E. Kline, Sr., P.O. Box 823, Clear Lake, Iowa 50428

[21] Appl. No.: 218,440

[22] Filed: Mar. 28, 1994

[51] Int. Cl.$^6$ ............................................. A01K 97/01
[52] U.S. Cl. ......................................................... 43/4
[58] Field of Search .................................... 43/4, 44.99

[56] References Cited

U.S. PATENT DOCUMENTS

| | | | |
|---|---|---|---|
| 2,838,196 | 6/1958 | Chapman | 43/4 |
| 2,877,595 | 3/1959 | Stewart | 43/4 |
| 4,438,757 | 3/1984 | Anderson | 126/360 R |
| 4,747,226 | 5/1988 | Todd | 43/4 |
| 4,761,909 | 8/1988 | Christian et al. | 43/4 |
| 4,845,875 | 7/1989 | Norwick | 43/4 |
| 4,910,906 | 3/1990 | Schefers et al. | 43/4 |

Primary Examiner—Kurt Rowan
Attorney, Agent, or Firm—Henry S. Miller; David L. Baker; Rhodes & Ascolillo

[57] ABSTRACT

An apparatus for maintaining an ice opening in ice fishing holes and maintaining a live bait supply over a long period including a steel tube of a size to fit the ice hole, closed at one end and having a ring mounted on the closed end so that a minnow saver bait cage may be tethered below the tube in the water. The tube is held down and freezes in place. The tube is removed by igniting a quantity of combustible material in the tube, where the heat will melt sufficient surrounding ice and allow the tube to gently and quietly move up and be removed from the hole with the bait cage.

6 Claims, 2 Drawing Sheets

COMBINATION ICE FISHING HOLE MAINTAINING AND BAIT STORAGE DEVICE

BACKGROUND OF THE INVENTION

1. Field of the Invention

This invention relates generally to the sport of ice fishing and more particularly to equipment used in the sport for maintaining holes in the ice while simultaneously storing live bait over a period of time.

2. Description of the prior art

Ice fishing is a popular winter sport in many geographical regions. In the most common and well known form of the sport each fisherman has his own shack that is taken out on the ice. The shack is heated and stocked with provisions so that the angler will be comfortable during his time on the ice. Since the shacks are not easily moved they tend to remain in the same spot for the entire season.

Fishing from the shack is done through a hole drilled or chipped through the ice either by hand or with a power tool. In either event, when the ice reaches a thickness of six or more inches creating a hole requires substantial hard work and is very time consuming. As a practical matter, the hole is made through an opening in the floor of the shack designed for that purpose. When the heat is turned off in the shack, subfreezing temperatures soon cause the water to freeze and close the hole. This is particularly true where the shack is only used on the weekend.

In an effort to eliminate the work and time involved before the fisherman can drop his hook into the water, a number of devices have been suggested to keep the hole ice free when not being fished. By way of example, the following U.S. Patents show different prior art attempts to prevent this icing condition: U.S. Pat. No. 4,910,906 issued Mar. 27, 1990 to Schemers et al, relates to a method and apparatus using an inflatable bladder for maintaining a hole open in outdoor ice atop a body of water, the device includes a top plug with an air tube and valve, an elongated bladder extending down from the plug, and radially spaced apart longitudinal cords in the bladder which constrain elongated growth but enable diameter growth of the bladder. U.S. Pat. No. 4,845,875 issued Jul. 11, 1989 to Norwick discloses an inflatable apparatus for temporarily plugging holes in an ice layer. The inflatable device includes a hollow, generally cylindrical tubular assembly with an inflatable bladder forming the core, and having a plurality of discrete layers enclosing the inflatable core which include a foam liner enclosing the bladder and an outer sleeve disposed over and firmly enclosing the foam liner and inflatable bladder. U.S. Pat. No. 4,761,909 issued Aug. 9, 1988 to Christian et al shows an ice hole fishing plug that includes a hollow elongated tubular member, constructed of flexible resilient material and including an inlet-outlet for admitting and discharging fluid under pressure, adapted to be placed in a hole in a layer of ice so that the top and bottom ends extend upwardly and downwardly beyond the layer of ice such that, when inflated, the top and bottom ends expand to seal the hole and to retain the hollow tubular member as an easily removable plug. U.S. Pat. No. 4,747,226 issued May 31, 1988 to Todd relates to a fishing assembly adapted to prevent an ice hole from freezing over. The fishing assembly, includes, a plastic tubular elongated sleeve for placement inside the ice hole and a fiat, annular flange which extends radially outward from the sleeve, for retaining the fishing assembly in position inside the ice hole. U.S. Pat. No. 4,438,757 issued Mar. 27, 1984 to Anderson discloses a device for reopening a hole in an ice bound water source, where a tubular member is inserted into the hole and becomes frozen in place. The ice block that forms in the interior region of the tubular member can be ejected. The tubular member is heated by a fluid circulating and heating system which forces heated fluid between the walls of the tubular member. The heated fluid allows for the release of the ice block and dislodgment of the entire unit from the frozen surface of the water supply. There continues to exist, however, the need for a simple, reliable and inexpensive means for maintaining an ice fishing hole and storing live bait under subfreezing conditions.

SUMMARY OF THE INVENTION

The invention provides a quick, simple and inexpensive solution to the problems of ice hole freezeovers and storing live bait for long periods in freezing weather. The invention consists of a steel tube closed at one end and having a ring fixed to the outside of the plate closing the end. Attached to the ring is a tether which connects the steel tube of the invention and the minnow saver also part of the invention. The minnow saver is allowed to drop into the water with its cargo of bait tethered to the steel ice tube which is then pressed into the water against the natural buoyancy of the displaced water. The floor plate, a part of every fishing shack, is lowered thereby holding the ice tube down in the water. It may be necessary to fasten the floor plate in the down position with an appropriate fastening tool.

The minnow saver is a cylindrically shaped container constructed from $\frac{1}{4}$ inch galvanized mesh with a hinged opening on one end. The hinged opening also contains a ring for the attachment of the tether.

When the ice tube has been in the water for a short period of time it will become frozen in place and unmovable. When it is time to remove the ice tube, the floor plate and fasteners will be removed and a quantity of newspaper inserted into the ice tube. The paper is ignited and the heat generated will melt the ice holding the tube and it will quietly and gently bob up through the ice like a cork. The tube is then simply removed from the hole with the minnow saver and fishing may begin.

As an additional feature, a base ring may be used to support the tube out of the water. With the base ring in use it is now possible to supply additional paper to the tube and use it for a source of heat in the fishing shack.

It is therefore an object of the invention to provide a new and improved ice fishing hole maintaining and bait storage device.

It is another object of the invention to provide a new and improved ice fishing hole maintaining and bait storage device that is quick and easy to use.

It is a further object of the invention to provide a new and improved ice fishing hole maintaining and bait storage device that will preserve live bait for long periods of time in below freezing temperatures.

It is another object of the invention to provide a new and improved ice fishing hole maintaining and bait storage device that is gentle and quiet and will not frighten fish in the area when it is removed.

It is still another object of the invention to provide a new and improved ice fishing hole maintaining and bait storage device which is of a durable and reliable construction.

It is still a further object of the invention to provide a new and improved ice fishing hole maintaining and bait storage device which may be easily and efficiently manufactured and marketed.

These and other advantages, features and objects of the invention will become more apparent from the following description taken in connection with the illustrative embodiment in the accompanying drawings.

DETAILED DESCRIPTION OF THE PREFERRED EMBODIMENT

Figure 1:
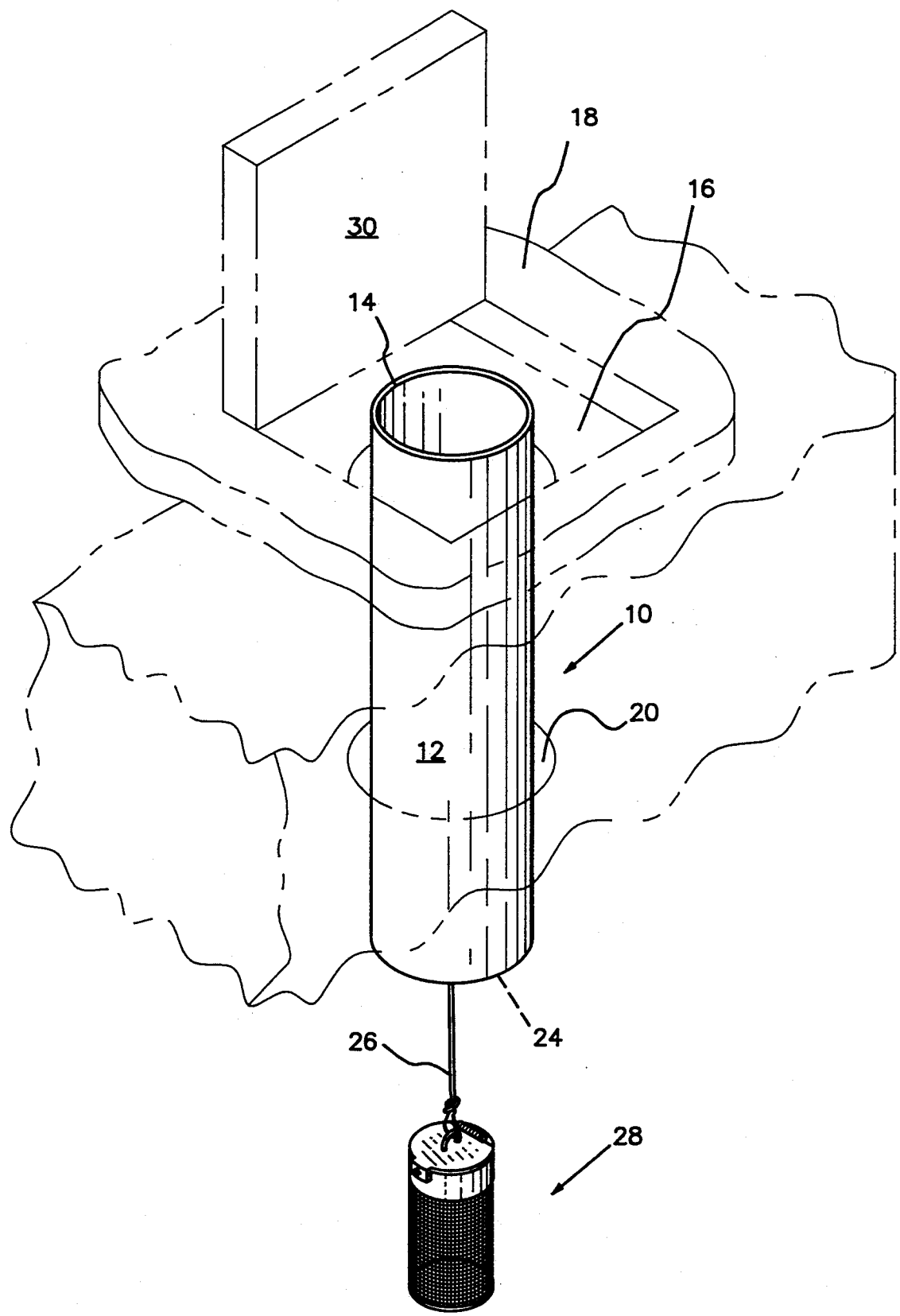
FIG. 1 is a perspective view of the preferred embodiment of the present invention.

Referring now to FIG. 1 the invention is shown generally at 10. A tube 12 of steel or other suitable material having a wall 14 with a thickness of at least 22-gauge, passes through floor plate opening 16 in fishing shack floor 18. A hole 20 has been cut or drilled into ice 22. The end of tube 12 is closed (24) and contains a means, not shown, to affix tether 26 for supporting minnow saver 28. Because of the natural buoyancy created by the displacement of water by tube 10 it will settle into the water only a limited amount when inserted into the ice hole. Accordingly floor plate 30 is lowered and secured by means not shown, thereby holding the tube, of approximately thirty-six inches in length, down against the pressure of the water. In a short time, depending on the temperature, the water will freeze around the tube securing it in place.

In order to remove the ice tube from its frozen position and provide access to the water and minnow saver a quantity of a combustible material such as newspaper is placed into placed into the tube and ignited. The heat from combustion will quickly but gradually allow the tube to become free and rise through the floor plate opening. The minnow saver can be easily detached from the tube and secured to other means on the shack floor.

Figure 2:
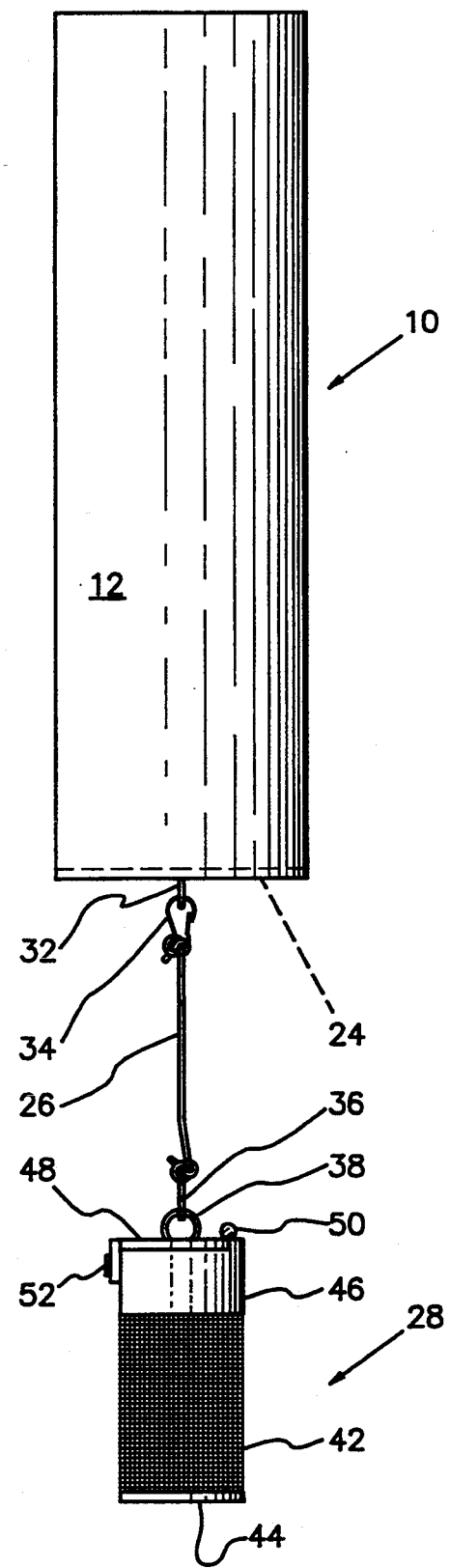
FIG. 2 is a side elevation view of the preferred embodiment of the present invention.

FIG. 2 shows the ice tube generally at 10 and the minnow saver generally at 28. Ice tube 12 is closed at one end by plate 24, which includes a ring 32 sized and adapted to receive snap hook 34 attached at one end of tether 26. A similar snap hook 36 is attached to the opposite end of the tether and engages ring 38 on minnow saver 28.

Minnow saver 28 is formed of a cylindrically shaped section of galvanized mesh 40 having openings in the order of one quarter inch per side. The one end of the mesh is closed by means of a solid plate. The other end of the mesh has a solid collar 46 attached around the circumference containing an access door 48 engaging the collar 46 by a hinge 50. The door is held and secured by a simple latch mechanism 52. The minnow saver is of sufficient size and dimension to hold eight or nine dozen minnows for several months without ill effect.

Figure 3:
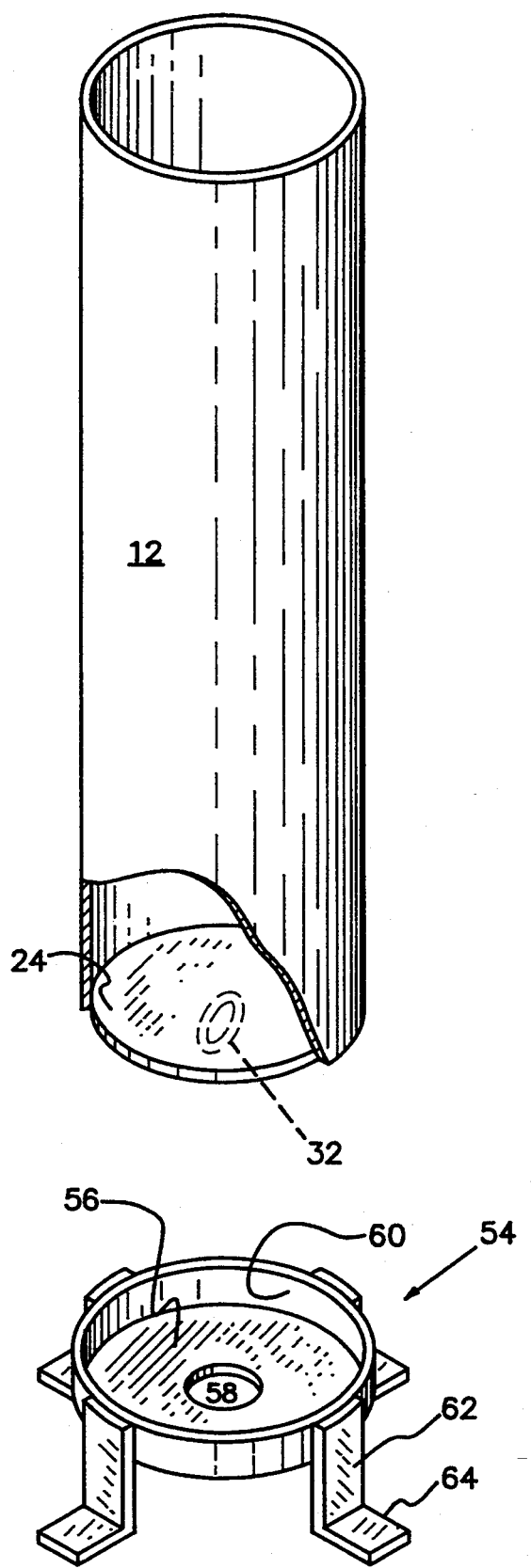
FIG. 3 is a perspective view of an alternative embodiment of the present invention.

FIG. 3 shows an alternative embodiment of the invention, utilizing the ice tube as described with regard to FIG. 2. A stand, shown generally at 54, is adapted to receive ice tube 12. The receiver member includes a plate 56, having an aperture 58 located so as to allow ring 32 to pass therethrough and an annular ring 60 around the circumference of the plate and having an inside diameter larger then the outside diameter of the ice tube. Four legs 62 with feet 64 support the receiver and elevate it sufficiently to allow clearance for ring 32. Once placed in the receiver the ice tube may be simply stored or combustible material could be inserted and ignited to provide heat for the fishing shack.

While preferred forms and arrangements have been shown in illustrating the invention, it is to be understood that various modifications may be made without departing from the spirit and scope of this disclosure.

What is claimed is:

1. An apparatus for maintaining an ice opening and supply of bait comprising:
   a tubular shaped means having a first end and a second end;
   means for closing said second end;
   said means for closing comprising a plate;
   means for affixing, attached to the means for closing;
   said means for affixing comprises a ring loop;
   cage means;
   the cage means comprises a galvanized wire mesh cylinder, closed at one end and having a removable closure at the other end;
   means for affixing attached to the cage means;
   the means for affixing attached to the cage is a ring loop;
   said tether means connecting the cage means to the means for closing; and said tether means comprising a snap clip secured on each end for releasibly engaging the ring loop on the means for closing and the ring loop on the cage.

2. An apparatus for maintaining an ice opening and supply of bait according to claim 1 wherein: the removable closure includes a door, having a hinge along one edge and a latch on another edge.

3. An apparatus for maintaining an ice opening and supply of bait according to claim 2 further including: a stand for supporting said tubular shaped means by engagement with the said second end.

4. An apparatus for maintaining an ice opening and supply of bait according to claim 3 wherein: said stand includes a cup shaped member having an inside diameter larger then the outside diameter of the tubular shaped member.

5. An apparatus for maintaining an ice opening and supply of bait according to claim 4 wherein: said stand includes a plurality of legs spaced equidistant around the perimeter of the stand and having feet means for engaging the surface upon which it rests.

6. An apparatus for maintaining an ice opening and supply of bait according to claim 5 wherein: the tubular shaped means is formed of twenty two gage steel.

* * * * *